(12) United States Patent
Hackel et al.

(10) Patent No.: US 7,894,496 B2
(45) Date of Patent: *Feb. 22, 2011

(54) GAIN MEDIA EDGE TREATMENT TO SUPPRESS AMPLIFIED SPONTANEOUS EMISSION IN A HIGH POWER LASER

(75) Inventors: Lloyd A. Hackel, Livermore, CA (US); Thomas F. Soules, Livermore, CA (US); Scott N. Fochs, Livermore, CA (US); Mark D. Rotter, San Ramon, CA (US); Stephan A. Letts, San Ramon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 12/265,658

(22) Filed: Nov. 5, 2008

(65) Prior Publication Data

US 2009/0059977 A1 Mar. 5, 2009

Related U.S. Application Data

(63) Continuation of application No. 10/984,565, filed on Nov. 8, 2004, now Pat. No. 7,463,660.

(60) Provisional application No. 60/570,255, filed on May 11, 2004.

(51) Int. Cl.
*H01S 3/00* (2006.01)

(52) U.S. Cl. .............................. 372/33; 372/11; 372/39; 372/66; 372/67

(58) Field of Classification Search ................... 372/11, 372/33, 39, 67
See application file for complete search history.

(56) References Cited

U.S. PATENT DOCUMENTS

| | | | | |
|---|---|---|---|---|
| 4,217,382 | A | 8/1980 | Toratani | 428/66 |
| 4,849,036 | A | 7/1989 | Powell et al. | 156/99 |
| 5,335,237 | A * | 8/1994 | Zapata | 372/33 |
| 5,441,803 | A * | 8/1995 | Meissner | 428/220 |
| 5,718,979 | A | 2/1998 | Marker et al. | 428/426 |
| 6,738,299 | B2 * | 5/2004 | Noguchi | 365/200 |
| 2002/0110164 | A1 | 8/2002 | Vetrovec | 372/36 |

OTHER PUBLICATIONS

Notice of Allowance from U.S. Appl. No. 10/984,565 mailed on Aug. 18, 2008.
Office Action Summary from U.S. Appl. No. 10/984,565 mailed on Mar. 18, 2008.

* cited by examiner

*Primary Examiner*—Dung T Nguyen
(74) *Attorney, Agent, or Firm*—John H. Lee; James S. Tak (57) ABSTRACT

A novel method and apparatus for suppressing ASE and/or parasitic oscillation modes in a laser is introduced. By roughening one or more peripheral edges of a solid-state crystal or ceramic laser gain media and by bonding such edges to a predetermined electromagnetic absorbing material arranged adjacent to the entire outer surface of the peripheral edges of the roughened laser gain media, ASE, parasitic oscillation modes and/or residual pump energy can be effectively suppressed.

67 Claims, 3 Drawing Sheets

GAIN MEDIA EDGE TREATMENT TO SUPPRESS AMPLIFIED SPONTANEOUS EMISSION IN A HIGH POWER LASER

RELATED APPLICATION

This application is a continuation of U.S. patent application Ser. No. 10/984,565 filed Nov. 8, 2004, now U.S. Pat. No. 7,463,660, which claims the benefit of U.S. Provisional Application No. 60/570,255, filed May 11, 2004, entitled, "Gain Media Edge Treatment To Suppress Amplified Spontaneous Emission In A High Power Laser", which are all incorporated herein by this reference.

GOVERNMENT RIGHTS

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND OF THE INVENTION

1. Field of the Invention

The present invention relates to a gain media edge treatment for reducing or eliminating parasitic oscillations in solid state laser materials. More specifically, it relates to an absorbing material bonded to the roughened edges of a gain medium so as to minimize amplified spontaneous emission (ASE) and at the same time minimize stresses produced within the medium.

2. Description of Related Art

A high peak power solid-state laser, especially one that runs in a pulsed heat capacity mode with solid state gain medium and relatively high gain, typically needs a means of defeating the naturally occurring transverse gain that can lead to losses from amplified spontaneous emission (ASE) and/or to parasitic oscillation. Background information on such deleterious ASE and parasitic oscillation effects can be found in "Fluorescence Amplification and Parasitic Oscillation Limitations in Disk Lasers", by J. B. Trenholme, NRL Memorandum Rep. 2480, July, 1972; J. E. Swain, et al., J. Appl. Phys., 40, p. 3973 (1969); and J. M. McMahon et al., IEEE J. Quantum Electron. QE-9, p. 992 (1973)).

A technique that has been utilized to suppress ASE and to suppress the onset of parasitic oscillations involves bonding a designed absorbing material to the edges of the gain medium (i.e., an edge cladding). If the index of refraction of the bonded absorbing material substantially matches that of the gain medium, a substantial portion of the ASE is coupled out of the gain media and into the absorbing material before it can build sufficiently to depopulate the excited state and thus reduce or clamp the gain. In general, such claddings include a material that is refractive index matched to the laser gain material and which contains a dopant that absorbs at the laser (ASE) frequency. A number of different materials have been used for cladding, ranging from sprayed-on glass frits to liquids to castings of monolithic glass. (See, for example, G. Dube and N. L. Boling, in Applied Optics, Vol. 13, p. 699 (1974); S. Guch, Jr., in Applied Optics, Vol. 15, p. 1453 (1976); and D. Milam, C. W. Hatcher and J. H. Campbell, in "Platinum Particles in the Nd:doped Disks of Phosphate Glass in the Nova Laser", in Laser Induced Damage in Optical Materials: 1985: Proceedings of the Boulder Damage Symposium, November 1985, Boulder, Colo.)

Additional background information on edge claddings can be found in, U.S. Pat. No. 4,849,036, incorporated herein by reference in its entirety, titled "Composite Polymer-Glass Edge Cladding For Laser Disks," issued Jul. 18, 1989 to Powell et al, including the following: "Large neodymium glass laser disks for disk amplifiers such as those used in the Nova laser require an edge cladding which absorbs at 1 micrometer. This cladding prevents edge reflections from causing parasitic oscillations which would otherwise deplete the gain."

In research by J. E. Murray et al., in "Silicone Rubber Edge Claddings for Laser Disk Amplifiers", in CLEO 84, Paper No. THF-2 (June, 1984), they report that disk amplifiers can be produced having edge claddings to prevent feedback of ASE. In particular, a room temperature-vulcanized (RTV) silicone rubber is poured about the peripheral edge of the laser disk and plates of filter glass can be embedded in the rubber to absorb ASE. As such, this treatment met most of the requirements of a low-cost, functional edge cladding which can be used on a large laser system comprised of a glass gain media. It is potentially low cost to implement, because the materials are inexpensive, and the process can be applied at room temperature. It is beneficial as an edge cladding, because the cured silicone rubber is water-clear, and its refractive index can be adjusted over the range from about 1.42 to about 1.54, which includes most laser glasses.

However, in crystal and/or ceramic media, the index is usually higher (up to about 1.9) and thus an index of about 1.5 cannot effectively couple out ASE. For normal incidence, the fraction of light reflected in propagating from a material of index $n_1$ to a material of $n_2$ is given by $R=((n_{2-2})(n_2+n_2))^2$. For light propagating from a material of index $n_1$ into a material having an index of 1.5, 1.4% of the light is reflected. For steeper angles, the reflection percentage gets substantially higher and at the critical angle all of the light is totally internally reflected. One approach has been to use diffusion bonding of the same crystal material but doped to absorb the ASE due to the gain media. However, because diffusion bonding often requires mating two very flat ($<10/\lambda$) surfaces and applying both pressure and heat, it is a very difficult, expensive, and time consuming process with low yield and bonds may have gaps or fail in operation. In addition, since the main crystal and edge cladding are in intimate contact after diffusion bonding, heating of the edge cladding by the ASE introduces stresses back across the bond which can fracture either the crystal or the edge cladding. Such an approach is also time consuming and expensive. Another approach that is beneficial in defeating transverse ASE is to roughen the edges of the slab with bead blasting or other means. This creates very small reflection sites which generates large diffraction losses to the reflected light. However, such a technique, on its own, does not in general sufficiently defeat ASE gain. Still another approach is to cant the edges so as to redirect the ASE normal to the face of the slab. Again, while such a technique is helpful, it decreases the effective area of the slab and is generally not sufficient in itself to defeat ASE gain.

SUMMARY OF THE INVENTION

One embodiment of the present invention is directed to method for suppressing ASE and parasitic oscillations in a high average power solid-state laser that includes: roughening peripheral edges of a solid-state crystal or a ceramic laser gain media; providing a bonding material transparent both to light associated with ASE and parasitic oscillations and/or a residual pump energy and having a refractive index substantially matched to the solid-state crystal or ceramic laser gain media; providing an electromagnetic absorbing material arranged adjacent to the entire outer surface of the peripheral edge of the roughened solid-state crystal or ceramic laser gain media, wherein the absorbing material is designed to absorb ASE, parasitic oscillations and/or the residual pump energy; and using the bonding material to bond the electromagnetic absorbing material to the peripheral edges of the solid-state crystal or ceramic laser gain media.

Another aspect of the present invention is directed to a method for suppressing ASE and parasitic oscillations in a high average power solid-state laser, that includes: roughening one or more peripheral edges of a solid-state crystal or ceramic laser gain media; providing a spaced apart electromagnetic absorbing frame surrounding the outer surface of the peripheral edges of the solid-state crystal or ceramic laser gain media, wherein the absorbing frame is adapted for absorbing ASE, parasitic oscillations and/or a residual pump energy; and introducing a high index bonding material between the spaced apart absorbing frame and the solid-state crystal or ceramic laser gain media so as to bond the absorbing frame and the solid-state crystal or ceramic laser gain media, wherein the bonding material comprises a refractive index substantially matched to the solid-state crystal or ceramic laser gain media.

A further aspect of the present invention is directed to an apparatus configured for suppressing ASE and parasitic oscillations that includes a solid-state crystal or ceramic laser gain media having roughened edges and an electromagnetic absorbing material arranged adjacent to the outer roughened surface of the peripheral edges of the aforementioned laser gain media, wherein the absorbing material is designed to absorb ASE, parasitic oscillations and/or the residual pump energy. In addition, a bonding material transparent both to ASE and parasitic oscillations and/or a residual pump energy and having a refractive index substantially matched to the solid-state crystal or ceramic laser gain media is utilized for bonding the electromagnetic absorbing material to the entire outer surface of the peripheral edge of the solid state laser gain media.

Another aspect of the present invention is directed to an apparatus configured for suppressing ASE and parasitic oscillations that includes a solid-state crystal or ceramic laser gain media having one or more roughened edges and a spaced apart electromagnetic absorbing frame configured to surround the outer surface of the peripheral edges of the solid-state crystal or ceramic laser gain media and adapted for absorbing ASE, parasitic oscillations and/or a residual pump energy. In addition, a high index bonding material having a refractive index substantially matched to the solid-state crystal or ceramic laser gain media is utilized between the spaced apart absorbing frame and the peripheral edges of the solid-state crystal or ceramic laser gain media to bond the absorbing frame and the solid-state crystal or ceramic laser gain media.

Another aspect of the present invention is directed to a method, comprising: roughening one or more peripheral edges of at least one laser gain media selected from a solid-state crystal and a ceramic; providing a bonding material transparent to light associated with Amplified Spontaneous Emissions (ASE) and parasitic oscillations and/or a residual pump energy; providing an electromagnetic absorbing material along an entire outer surface of the peripheral edge of said roughened laser gain media, wherein said absorbing material is designed to absorb at least one of ASE, parasitic oscillations, and said residual pump energy; and using said bonding material to bond said electromagnetic absorbing material with at least said peripheral edges of said laser gain media.

A further aspect of the present invention is directed to a method for suppressing ASE and parasitic oscillations in a high average power solid-state laser, comprising: roughening one or more peripheral edges of at least one laser gain media selected from a solid-state crystal and a ceramic; providing an electromagnetic absorbing frame, wherein said absorbing frame is adapted for absorbing at least one of Amplified Spontaneous Emissions (ASE), parasitic oscillations and a residual pump energy; and providing a bonding material between said absorbing frame and said laser gain media so as to bond said absorbing frame and said laser gain media.

Yet another aspect of the present invention is directed to an apparatus, comprising: at least one laser gain media selected from a solid state crystal and a ceramic, wherein said laser gain media has one or more roughened edges; an electromagnetic absorbing material arranged adjacent to the outer roughened surface of the peripheral edges of said laser gain media, wherein said absorbing material absorbs at lest one of Amplified Spontaneous Emissions (ASE), parasitic oscillations and said residual pump energy; and a bonding material transparent to ASE and parasitic oscillations and/or a residual pump energy, the bonding material bonding said electromagnetic absorbing material to the roughened edges of said laser gain media.

Another aspect of the present invention is directed to an apparatus, comprising: at least one laser gain media selected from a solid state crystal and a ceramic, wherein said laser gain media can be configured with one or more roughened edges; an electromagnetic absorbing frame positioned towards the outer surface of the peripheral edges of said laser gain media and adapted for absorbing at least one of Amplified Spontaneous Emissions (ASE), parasitic oscillations and a residual pump energy; and a bonding material arranged between said spaced apart absorbing frame and the peripheral edges of said laser gain media so as to bond said absorbing frame and said laser gain media.

Accordingly, embodiments of the present invention provides a desired method and apparatus for cladding the peripheral edges of crystal or ceramic laser gain media so as to suppress ASE and parasitic oscillation modes while minimizing thermally induced stresses in high average power laser systems.

DETAILED DESCRIPTION OF THE INVENTION

Referring now to the following detailed information, and to incorporated materials; a detailed description of the invention, including specific embodiments, is presented.

Unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

General Description

ASE and Parasitic Oscillations

During optical pumping, some of the excited dopant atoms spontaneously decay, emitting photons at the frequency of a designed laser transition. Such photons can be emitted at angles greater than the critical angle for total internal reflection (TIR) so as to be trapped between a gain media's disk faces and amplified (i.e., ASE) as they travel through the laser gain media. In high average disk amplifiers in particular, such ASE can be totally or partially reflected back into the disk. If the gain in traversing the disk exceeds the edge losses then the process can proceed indefinitely. This effect is referred to as a parasitic oscillation.

The present invention is directed at suppressing ASE parasitic oscillations in a high index (e.g., greater than about 1.5) gain amplifier, such as a crystal laser slab or disk or an equivalent made of ceramic. Such suppression embodiments, as disclosed herein, includes applying a substantially index matching bonding material (e.g., an epoxy or an elastomer), having a thickness after curing between about 1 micron and up to about 10 mm, to the edges of a crystal or ceramic laser slab or disk after roughening the edges of such lasing media. It is important that there be no bubbles or other reflecting material between the slab and the bonding agent.

Figure 1A:
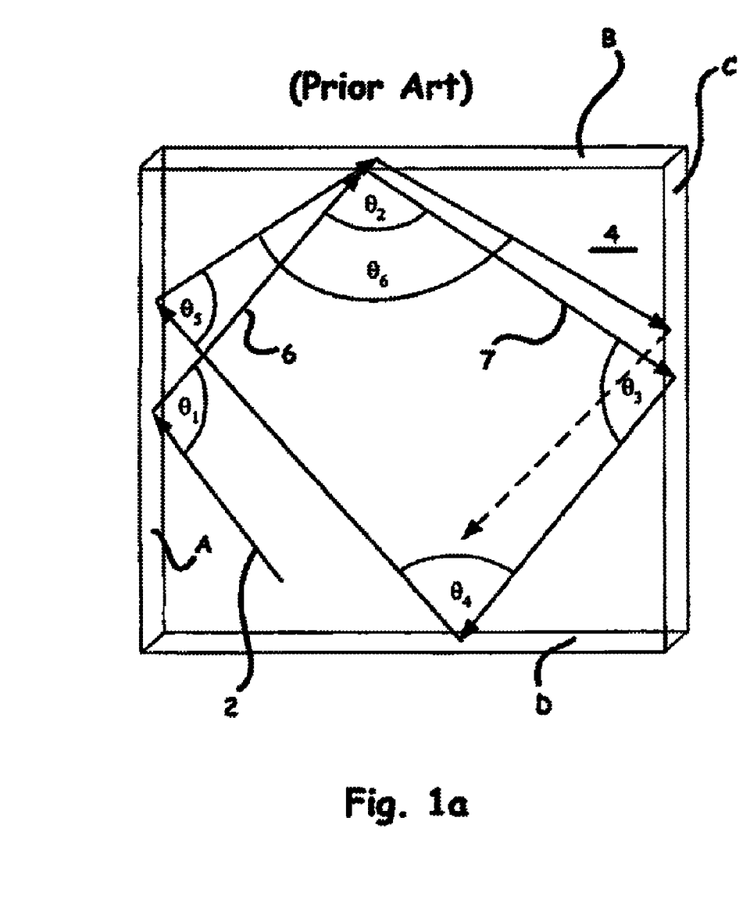
FIG. 1a illustrates ASE and parasitic oscillation in a laser amplifier slab material.

FIG. 1a illustrates ASE and a parasitic oscillation mode produced in a high index slab 4. As shown in FIG. 1a, upon ASE, an emitted photon can travel along a direction, as shown by a ray 2, and can strike a smooth edge or face surface (denoted by the letter A) at an angle $\theta_1$ less than a critical angle so as to be totally internally reflected (as shown by a reflected ray 6). Ray 6 is subsequently incident on an adjacent side surface (denoted as B) at an incident angle $\theta_2$ less than the critical angle and again internally reflected, as shown by a second reflected ray 7. Such reflected ray paths can proceed to adjacent side surfaces C and D and back to surfaces A and B of slab 4 again at angles (e.g., $\theta_3$, $\theta_4$, $\theta_5$, and $\theta_6$, etc.) less than the critical angle and can thus be totally internally reflected a number of times so as to be trapped inside slab 4. As discussed above, if incident ray 2 and subsequent reflected rays, e.g., 6 and 7, can achieve a gain exceeding the edge reflection losses then such a resultant path can lead to a parasitic oscillation.

If slab 4, as shown in FIG. 1a, is configured with a bonded absorbing material (i.e., a cladding [not shown]) that is designed for the wavelengths of ASE, parasitic oscillations, and/or absorbed pump energy of often greater than about 800 nm, a temperature increase arises resulting in high tensile stresses to the laser gain media. A temperature increase due to ASE is a maximum at an interface between the peripheral edge of slab 4 and the bonded cladding material and decreases exponentially with the distance into the cladding.

In general, a peak temperature rise occurring at the interface is proportional to the cladding absorption coefficient and can lead to deleterious thermally induced stresses. Such temperature increases can cause a cladding to expand but is restricted by the bond to the laser gain media so as to cause lateral bending of the gain media's surface. Such a bending motion produces high tensile stress in the cladding that is perpendicular to the adhesive interface and can delaminate the adhesive bond and/or break the crystalline cladding material and/or cause wavefront distortions due to thermal gradients in the material. For a more detailed explanation of thermally induced stresses in laser based systems, see J. H. Pitts, et al., "Thermal Stress in the Edge Cladding of Nova Glass Laser Disks", in the Proceedings of the 12th Symposium on Fusion Engineering, Oct. 12-16, 1987, Monterey, Calif.

Specific Description

The present invention often utilizes two beneficial embodiments, separately or in combination with each other, in preventing ASE and parasitic oscillations in a high average power laser apparatus/system. The first embodiment is to roughen the edge surfaces of a high index (i.e., an index greater than about 1.5) laser amplifier gain media often configured in a slab or disk geometry. Beneficial high index laser gain media capable of being utilized in the present invention include, but are not limited to, neodymium gadolinium gallium garnet (Nd:GGG or "GGG" for short), neodymium doped yttrium aluminum Garnet (Nd:YAG), ytterbium doped yttrium aluminum garnet (Yb:YAG), Ti:Sapphire (Ti:Al$_2$O$_3$), ruby (Cr$_2$O$_3$), and alexandrite (BeAl$_2$O$_4$:Cr$^{3+}$), etc., without departing from the scope and spirit of the present invention.

In addition, laser gain media configured, for example, as a disk or slab, can each have a thickness ranging approximately from about 1 mm to about 40 mm with transverse dimensions ranging from about 10 mm×10 mm to about 400 mm×400 mm. Moreover, the disks or slabs, can be cut into any shape, such as, but not limited to, rectangles or polygonal shapes, squares, ellipses, etc., to provide flat surfaces to which an absorbing material can be bonded.

Figure 1B:
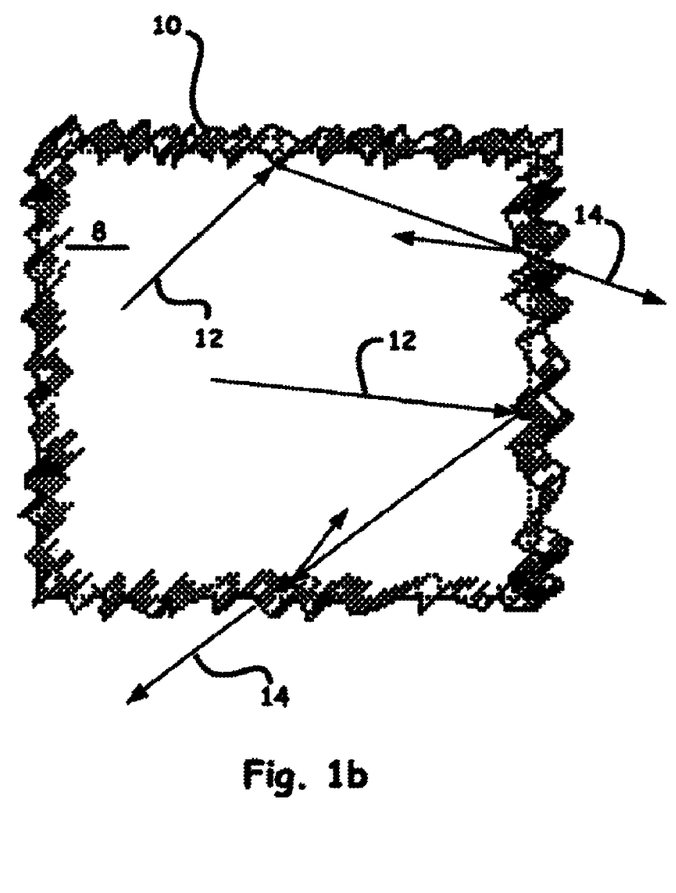
FIG. 1b illustrates a roughened peripheral edged amplifier slab to suppress ASE and parasitic oscillation.

Turning back to the drawings, FIG. 1b shows an example embodiment wherein one or more peripheral edge surfaces 10 of a laser gain media, such as an amplifier slab 8, is roughened to produce random planar features larger than the wavelength of light but still small, on the scale from about 10 µm to about 50 µm. Such a roughened surface 10, for example with feature sizes of about 50 µm, reflects incident light rays 12 that spread due to diffraction within an angular cone of about 10 degrees thus producing a cone of angles different than the median plane of a surface, which gives them a higher probability of being incident on other surfaces greater than the critical angle. Such a roughened surface can enable a ray, such as ray 14 as shown in FIG. 1b, a greater chance of escaping and can then be characterized by two parameters. First, there is a distribution of heights about the zero mean plane of the surface. If normal this distribution is characterized by a standard deviation. The second parameter is the correlation distance that describes how close together on average are the peaks and valleys. The ratio of these two numbers determines the spread of light reflected off the surface of the edge of the slab.

Accordingly, edge surfaces 10 of the present invention are roughened to enable an incident ray, such as rays 12, as shown in FIG. 1b, to spread out from a specular angle over a diffraction cone as determined by the ratio of the characterization parameters, diffract and escape through an edge of an amplifier. Often, the intensity from such a beam spread, as disclosed herein, is between about 5 degrees and about 45 degrees, more often between about 5 degrees and 30 degrees, most often between about 5 degrees and 15 degrees. Such desired angular spreads can prevent ASE from establishing an infinite path inside a laser gain medium and clamping the gain through parasitic modes.

Beneficial methods of roughing gain media edges can include polishing an amplifier slab, such as but not limited to, one or more Nd:GGG amplifier slabs on the edges with about a 30 micrometer to about a 45 micrometer sized alumina grinding media to achieve a rough surface followed by about a 5 micrometer to about a 10 micrometer grinding media for a smoother finish if desired. Another exemplary method entails preparing edges using a rough blanchard wheel, a smooth blanchard wheel, and a medium grinding wheel. Although the beneficial techniques described above can achieve a desired roughness or satiny surface in the present invention, any technique known to one of ordinary skill in the art, (e.g., standard grinding wheels, sandblasting, etc.) and operating within the parameters set forth herein, can also be employed in practice of the invention.

A second beneficial embodiment in preventing ASE and parasitic oscillations in a high average power laser apparatus/ system includes bonding the roughened edges of the gain medium, as discussed above, to an ASE and/or parasitic oscillation and/or a residual laser gain media pump energy absorbing media. Such absorbing media is designed in the present invention to absorb predetermined wavelengths produced by a crystal laser gain media. By way of example, when attempting to suppress 1.06 micron ASE, a high index media (e.g., a crystal media) doped with, for example, metal ions such as cobalt, e.g., Co:GGG, Co:YAG can be utilized to absorb predetermined wavelengths so as to meet the specifications of the present invention. As another beneficial absorbing media arrangement, the present invention can also include a metal absorber often having a coating (e.g., a blackened anodized coating) to absorb ASE and/or parasitic modes and/or a residual pump energy. It is important in all cases that the ASE absorbing material have a real index equal to or higher than the index of the bonding material so that it does not significantly reflect the ASE or totally internally reflect any parasitic rays at the interface with the bonding agent.

In order for the ASE to leave the gain medium crystal, there must be minimal reflection and maximum transmission at the interface between the amplifier slab and the cladding material as discussed above. This requires having a substantially matched index of refraction of the bonding medium, such as an elastomer or polymide, with the amplifier slab material at the wavelength of the ASE.

Beneficial laser gain media such as GGG and YAG respectively have indices of refraction of about 1.92 and 1.84 when utilizing a lasing wavelength of up to about 1.0 microns. High index bonding materials are often toxic and unstable, such as, for example, those containing arsenic or bromine, or they are too scattering (e.g., bonding materials containing nano-particulate titania). However, Monte-Carlo calculations indicate that roughened edges allows consideration of materials having lower indices of refraction. Such calculations show that the onset of parasitic lasing is delayed so that bonding agents with a real index of refraction of about 1.6 can be used for slabs being used for 20-30 kW lasers and those being considered for up to about 50 kW and using GGG:Nd as the gain medium. In addition, bonding agents with a real index of about 1.75 can be used without significant parasitic lasing for slabs and power densities being considered for 100 kW lasers. Therefore, beneficial arrangements can include roughening the peripheral edges of a solid state crystal or a ceramic amplifier disk and/or slab and applying a bonding agent having an index of refraction greater than about 1.5, more often greater than about 1.6, and most often greater than about 1.7, and even more often between about 1.6 and about 2.0, so as to effectively couple an ASE/parasitic/pump energy absorber at laser wavelengths of up to about 1.5 microns.

The present invention discloses the use of a two part epoxy as the bonding agent. Other epoxies, such as, ultraviolet or blue radiation cured epoxies can also be used as can other bonding agents, such as, silicones, polyurethanes, polyacrylics, etc. The choice of the particular two-part epoxies discussed below is based on (1) their superior bonding characteristics, (2) their high index of refraction versus all other materials considered, (3) their high temperature stability and (4) the fact that they did not contain a solvent which results in bubbles or gaps in the bonded surface when removed. An exemplary two part epoxy contains a linear epoxide molecule containing bis-biphenol groups and terminated on either end with epoxide groups. Four of such epoxide groups can react with a diamine curing agent, the second part of the epoxy, to create a tough in two-dimensional polymer molecule whose polar groups bond strongly to the surfaces. The key to having a high index of refraction in such materials is the incorporation of phenol groups and fused phenol groups and other conjugated ring structures in both the epoxy and the amine curing agent. The specific structures of the epoxy materials as utilized herein are proprietary.

The beneficial high index of refraction commercial epoxies are very stable at high temperatures due to the stability of the conjugated ring structure. Beneficial commercial epoxies include EP42HT (n=1.608), EP42HT-2 (n=1.614) and EP45HT (n=1.63) as supplied by Masterbond Inc. (Masterbond™), a corporation located in Hackensack, N.J. All are two part epoxies. EP45HT requires heating to 150 C to cure while the others cure at room temperature over approximately 24 hours. The compositions, as discussed above, are proprietary but EP42HT is stable to a temperature of about 435 F, EP42HT-2 to a temperature of about 450 F and EP45HT to a temperature of about 500 F. EP42HT-2 in particular proved to be very beneficial because it cures at room temperature and is tough and resistant to not only thermal cycling but such an epoxy also exhibits no effect from direct bombardment from electromagnetic pump energy of greater than about 800 nm, e.g., energy directed from diode arrays having an emission wavelength of about 808 nm.

The present invention will be more fully understood by reference to the following two examples, which are intended to be illustrative of the present invention, but not limiting thereof.

Example I

In the first example embodiment, the roughened edge surfaces of a slab or disk amplifier are bonded to the ASE and/or parasitic oscillation and/or pump energy cladding material which may or may not be roughened but which can have an index of refraction greater than that of an epoxy so as to avoid total internal reflection at the epoxy cladding boundary. In addition, such a cladding material can be designed to have a thermal coefficient of expansion substantially matched with the laser gain media between about + or −5%. It is most desired that the index of refraction of such an absorber is the same as the epoxy. Beneficial absorbers that have been utilized in the practice of the present invention are Co:GGG (n=1.94) and KG3 (n=1.54). KG3 is an infrared absorbing glass made by Schott, Inc. but since its index of refraction is less than that of the epoxy it can result in clamping earlier than with GGG. Co:GGG is more beneficial than KG3 because such an absorber is relatively transparent to diode pump radiation at, for example, 880 nm. Hence, Co:GGG is heated only by the ASE and/or parasitic oscillation modes. The Co concentration is chosen e.g., at a concentration of up to 20 percent by weigh, so that heating is relatively uniform throughout the cladding. Moreover, by maintaining a uniform temperature within the cladding close to that of the lasing amplifier, excessive thermal gradients near the edge of the laser amplifier are inhibited to minimize unwanted wavefront distortion in the crystal laser gain media.

Figure 2A:
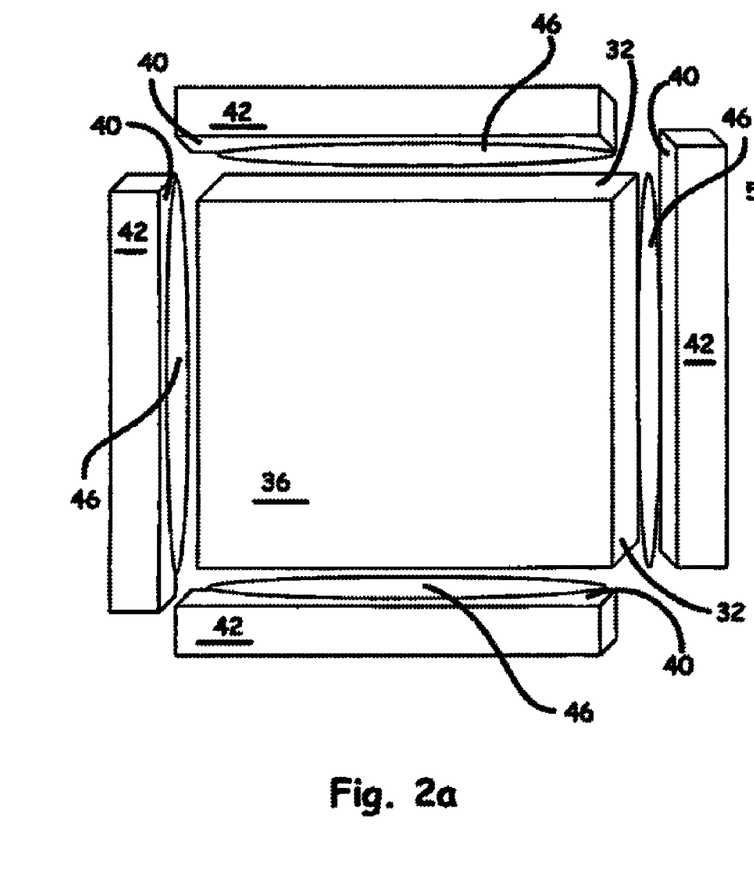
FIG. 2a shows an assembly of parts to construct an example embodiment.
Figure 2B:
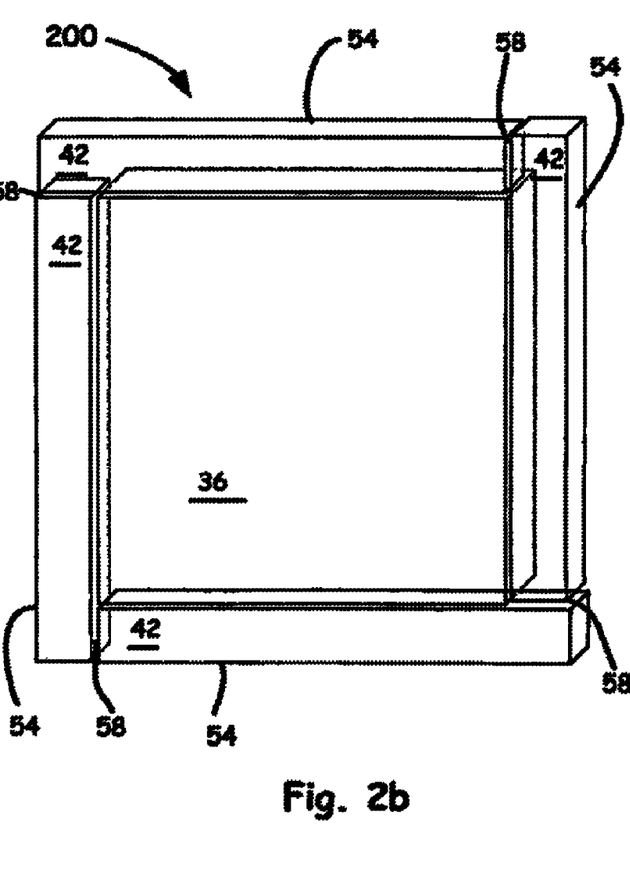
FIG. 2b shows an assembled example embodiment.

The method of example Embodiment I, constructed to principles of the present invention, is generally illustrated in FIG. 2a and FIG. 2b with reference to the following discussion. As shown in FIG. 2a, an edge 32 of a crystal slab or disk 36, such as GGG or Nd:YAG, is roughened as described above. An adjacent face 40 of an edge cladding absorber 42 can be either roughened or polished smooth. Both faces of amplifier slab 36 are masked. Edge surfaces 32 on both amplifier slab 36 and adjacent edge cladding pieces 40 are cleaned with acetone following by isopropyl alcohol. Slab edge surfaces 32 and adjacent edge cladding face 40 surfaces are then coated with a coupling agent as follows:

i. Carefully wipe the surfaces with a solution of 0.2 N acetic acid.
ii. Rinse surfaces by wiping with distilled water.
iii. Carefully wipe the surface with a solution of acetic acid, methanol and a silane Z2060.
iv. Rinse surface by wiping with distilled water.
v. Make up a mixture of epoxide EP42HT-2 Part A (100 parts by weight) and amine curing agent Part B (40 parts).
vi. Thoroughly mix in a test tube with a clean stirring rod.
vii. Centrifuge for 3 minutes to remove bubbles.
viii. A small bead 46 of epoxy mixture is applied to the lower part of each edge cladding 40.
ix. A predetermined edge cladding piece 42 is brought up to the edge of slab 36 so as force bead 46 to slowly spread out and thoroughly wet both surfaces without creating any bubbles.
x. A bead 46 of epoxy is then similarly applied to a surface of a second edge cladding piece 42 and it is attached and so forth.

Finally, as shown in FIG. 2b, an assembly, generally designated as reference numeral 200, of bonded pieces of slab 36 and cladding pieces 42, is placed in a suitable fixture and one or more sides 54 are clamped lightly in place, allowing for expansion joints (i.e., expansion gaps 58 of greater than about 0.01 cm) at each corner.

Example II

A "moat" of high index epoxy having an index of refraction greater than about 1.5, often greater than about 1.6, more often greater than about 1.7, and even more often having an index of refraction between about 1.6 and about 2.0, can be arranged by pouring epoxy into a gap from about 1 millimeter up to about 10 millimeters between a slab or disk and a frame, such as, for example, a metal frame constructed to absorb the ASE. Epoxy of the present invention is designed to thermally and mechanically isolate slab from an ASE absorbing material and allows a frame to be made of a metal material, such as blackened copper, which strongly absorbs the ASE on its surface. By making the absorbing material out of a metal coating, heat can be rapidly removed from the surface by the metal. The metal is "blackened" by oxidizing the metal. The index of refraction change at the surface is from a low index to a high index so as to avoid ASE reflection back into the epoxy and amplifier slab. Utilizing such metallic or metal oxide coatings enables flexibility of design and is additionally beneficial in machining the framework. Design flexibility can include flowing a cooling liquid, such as, but not limited to water, in optional cooling channels or passages or such channels or passages can be designed to heat and cool during operation so as to selectively control heat transfer between the gain media and the frame and thereby maintain minimal thermal gradients in a laser crystal or ceramic gain media.

Figure 3:
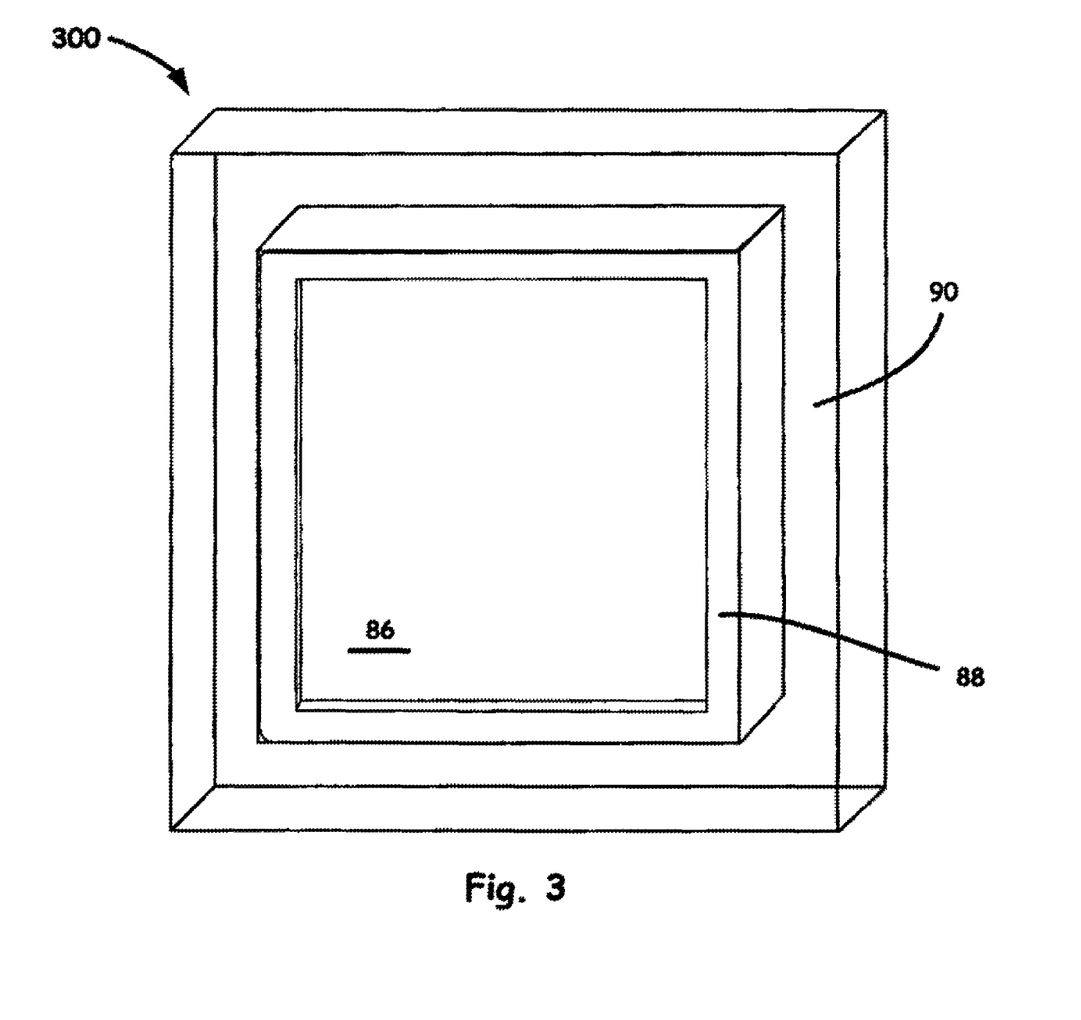
FIG. 3 illustrates a second example embodiment of the present invention.

A specific example method of Embodiment II, generally designated as reference numeral 300 in FIG. 3, is illustrated with reference to the following. Initially, an edge of a ceramic or a crystal slab or disk 86, such as GGG or Nd:YAG, is roughened as discussed above. Then, both faces of amplifier slab 86 are masked. Next, a frame 90, can be cut from a material, such as, but not limited to, a piece of copper metal and often designed to about the same thickness as slab 86. Frame 90 is larger than slab 86 so as to allow up to about a 2 mm "moat" of high index epoxy 88 around slab 86. Frame 90 may have expansion slots (not shown) cut at the corners or elsewhere to further alleviate any stress on slab 86 from differential thermal expansion of frame 90 relative to slab 86. However, the epoxy itself with its much smaller stress modulus and relatively low yield stress prevents larger stresses from occurring in the slab. In addition, as stated above, frame 90 can be configured with cooling channels or channels designed to heat and cool during operation so as to selectively control heat transfer between the gain media and the frame. Moreover, frame 90, such as a frame constructed from copper, can be annealed or hardened depending on the desired strength needed and treated as follows to create a black ASE absorbing oxide surface:

i. Carefully clean frame 88 with an alkaline cleaning solution.
ii. Rinse in a citric acid solution to further remove any oxide.
iii. Dip into a hot, 200 F, blackening solution made with, for example, Ebonal C. Ebanol C is a proprietary mixture of sodium hydroxide and sodium chlorite that can produce a black tenacious cupric oxide on the surface of a copper metal.
iv. Wipe excess material off the surface.
v. Wash in a hot DI water ultrasonic bath and dry.

Slab 86 is then positioned to be substantially in the middle of the metal frame, as shown in FIG. 3, and clamped down against a suitable seal (not shown) to seal off the bottom. An epoxy, such as, but not limited to, EP42HT-2 is then prepared as above and centrifuged to remove any bubbles. Epoxy 88 is then introduced into the 2 mm wide moat between the slab and metal frame with, for example, a hypodermic syringe taking care not to introduce any bubbles. The moat around the slab is substantially filled and an excess convex bead (not shown) is added to the top to compensate for contraction during cooling. A second bead can be added after or during curing to further account for shrinkage. The epoxied and clamped unit is then left at room temperature to cure for at least 24 hours.

Changes and modifications in the specifically described embodiments can be carried out without departing from the scope of the invention, which is intended to be limited by the scope of the appended claims.

The invention claimed is:

1. A method, comprising:
roughening one or more peripheral edges of at least one laser gain media selected from a solid-state crystal and a ceramic;
providing a bonding material transparent to light associated with Amplified Spontaneous Emissions (ASE) and parasitic oscillations and/or a residual pump energy;
providing an electromagnetic absorbing material along an entire outer surface of the peripheral edge of said roughened laser gain media, wherein said absorbing material is designed to absorb at least one of ASE, parasitic oscillations, and said residual pump energy; and using said bonding material to bond said electromagnetic absorbing material with at least said peripheral edges of said laser gain media.

2. The method of claim 1, wherein the bonding material has a refractive index substantially matched to said laser gain media.

3. The method of claim 1, wherein a refractive index of said bonding material comprises a real refractive index of greater than about 1.5 at laser wavelengths of up to about 1.5 microns.

4. The method of claim 1, wherein a refractive index of said bonding material comprises a refractive index range between about 1.6 and about 2.0 at laser wavelengths of up to about 1.5 microns.

5. The method of claim 1, wherein said bonding material comprises a two part epoxy or an elastomer.

6. The method of claim 5, wherein a thickness of said bonding material after curing between said laser gain media and said absorbing material is up to about 10 millimeters.

7. The method of claim 1, wherein said one or more roughened edges allow an incident ray to spread out from a specular angle over a cone.

8. The method of claim 7, wherein said cone comprises a width at half intensity between about 5 degrees and about 45 degrees.

9. The method of claim 1, wherein said laser gain media is at least one laser gain media selected from neodymium doped gadolinium gallium garnet (GGG"), neodymium doped yttrium aluminum garnet (Nd:YAG), ytterbium doped yttrium aluminum garnet (Yb:YAG), Ti:sapphire (Ti:Al$_2$O$_3$), ruby (Cr$_2$O$_3$), and alexandrite (BeAl$_2$O$_4$:Cr$^{3+}$).

10. The method of claim 1, wherein said absorbing material comprises an index of refraction substantially matched to said bonding material and said laser gain media.

11. The method of claim 10, wherein said absorbing material comprises a crystal media.

12. The method of claim 11, wherein said absorbing material is doped with active metal ions, at a concentration of up to about 20 percent by weight.

13. The method of claim 10, wherein said absorbing material comprises a ceramic media.

14. The method of claim 1, wherein said absorbing material comprises a metal.

15. The method of claim 1, wherein said metal comprises at least one of an ASE absorbing coating and a metal oxide coating.

16. The method of claim 1, wherein parasitic lasing can be inhibited at high average power extractions of up to about 100 kW.

17. A method for suppressing ASE and parasitic oscillations in a high average power solid-state laser, comprising:

roughening one or more peripheral edges of at least one laser gain media selected from a solid-state crystal and a ceramic;

providing an electromagnetic absorbing frame, wherein said absorbing frame is adapted for absorbing at least one of Amplified Spontaneous Emissions (ASE), parasitic oscillations and a residual pump energy; and providing a bonding material between said absorbing frame and said laser gain media so as to bond said absorbing frame and said laser gain media.

18. The method of claim 17, wherein said absorbing frame comprises one or more expansion slots so as to reduce stress induced on said laser gain media from differential thermal expansion of said absorbing frame relative to said laser gain media.

19. The method of claim 17, wherein said absorbing frame comprises a metal.

20. The method of claim 17, wherein the refractive index of said bonding material comprises a refractive index range of greater than about 1.5 at laser wavelengths of up to about 1.5 microns.

21. The method of claim 18, wherein said bonding material comprises a refractive index substantially matched to said laser gain media.

22. The method of claim 17, wherein the refractive index of said bonding material comprises a refractive index range between about 1.6 and about 2.0 at the laser wavelengths of up to about 1.5 microns.

23. The method of claim 17, wherein said bonding material comprises a two part epoxy.

24. The method of claim 23, wherein said two part epoxy comprises a dimension matched to a thickness of said laser gain media.

25. The method of claim 23, wherein said bonding material fills a gap from about 1 millimeter up to about 10 millimeters between said absorbing frame and said gain media.

26. The method of claim 17, wherein said one or more roughened edges enable an incident ray to spread out from a specular angle over a cone.

27. The method of claim 26, wherein said cone comprises a width at half intensity between about 5 degrees and about 45 degrees.

28. The method of claim 17, wherein said laser gain media is at least one laser gain media selected from neodymium doped gadolinium gallium garnet (GGG"), neodymium doped yttrium aluminum garnet (Nd:YAG), ytterbium doped yttrium aluminum garnet (Yb:YAG), Ti:sapphire (Ti:Al$_2$O$_3$), ruby (Cr$_2$O$_3$), and alexandrite (BeAl$_2$O$_4$:Cr$^{3+}$).

29. The method of claim 17, wherein parasitic lasing can be inhibited at high average power extractions of up to about 100 kW.

30. The method of claim 17, wherein said absorbing frame is capable of being cooled to selectively control heat transfer between said laser gain media and said frame.

31. The method of claim 17, wherein said cooling further comprises passages for a cooling liquid.

32. The method of claim 17, wherein said cooling liquid comprises water.

33. An apparatus, comprising:

at least one laser gain media selected from a solid state crystal and a ceramic, wherein said laser gain media has one or more roughened edges;

an electromagnetic absorbing material arranged adjacent to the outer roughened surface of the peripheral edges of said laser gain media, wherein said absorbing material absorbs at lest one of Amplified Spontaneous Emissions (ASE), parasitic oscillations and said residual pump energy; and a bonding material transparent to ASE and parasitic oscillations and/or a residual pump energy, the bonding material bonding said electromagnetic absorbing material to the roughened edges of said laser gain media.

34. The apparatus of claim 33, wherein a refractive index of said bonding material comprises a refractive index range of greater than about 1.5 at laser wavelengths of up to about 1.5 microns.

35. The apparatus of claim 33, wherein a refractive index of said bonding material comprises a refractive index range between about 1.6 and about 2.0 at the laser wavelengths of up to about 1.5 microns.

36. The apparatus of claim 33, wherein said bonding material comprises a two part epoxy or an elastomer.

37. The apparatus of claim 33, wherein a thickness of said bonding material after curing between said laser gain media and said absorbing material is up to about 10 millimeters.

38. The apparatus of claim 33, wherein said one or more roughened edges can enable an incident ray to spread out from a specular angle over a cone.

39. The apparatus of claim 33, wherein the bonding material has a refractive index substantially matched to said laser gain media.

40. The apparatus of claim 33, wherein said laser gain media is at least one laser gain media selected from neodymium doped gadolinium gallium garnet (GGG"), neodymium doped yttrium aluminum garnet (Nd:YAG), ytterbium doped yttrium aluminum garnet (Yb:YAG), Ti:sapphire (Ti:$Al_2O_3$), ruby ($Cr_2O_3$), and alexandrite ($BeAl_2O_4:Cr^{3+}$).

41. The apparatus of claim 33, wherein said absorbing material comprises an index of refraction substantially matched to said bonding material and said laser gain media.

42. The apparatus of claim 33, wherein said absorbing material comprises a crystal media.

43. The apparatus of claim 33, wherein said absorbing material comprises a ceramic media.

44. The apparatus of claim 42, wherein said absorbing material is doped with active metal ions, at a concentration of up to about 20 percent by weight.

45. The apparatus of claim 33, wherein said absorbing material comprises a metal.

46. The apparatus of claim 45, wherein said metal comprises an ASE absorbing coating.

47. The apparatus of claim 46, wherein said coating comprises a metal oxide coating.

48. The apparatus of claim 33, wherein parasitic lasing can be inhibited at high average power extractions of up to about 100 kW.

49. An apparatus, comprising:
at least one laser gain media selected from a solid state crystal and a ceramic, wherein said laser gain media can be configured with one or more roughened edges;
an electromagnetic absorbing frame positioned towards the outer surface of the peripheral edges of said laser gain media and adapted for absorbing at least one of Amplified Spontaneous Emissions (ASE), parasitic oscillations and a residual pump energy; and
a bonding material arranged between said spaced apart absorbing frame and the peripheral edges of said laser gain media so as to bond said absorbing frame and said laser gain media.

50. The apparatus of claim 49, wherein said absorbing frame further comprises one or more expansion slots so as to reduce stress induced on said laser gain media from differential thermal expansion of said absorbing frame relative to said laser gain media.

51. The apparatus of claim 49, wherein said absorbing frame comprises a metal.

52. The apparatus of claim 51, wherein said metal further comprises an ASE absorbing coating.

53. The apparatus of claim 52, wherein said coating comprises a metal oxide coating.

54. The apparatus of claim 49, wherein the refractive index of said bonding material comprises a refractive index range of greater than about 1.5 at laser wavelengths of up to about 1.5 microns.

55. The apparatus of claim 49, wherein the refractive index of said bonding material comprises a refractive index range between about 1.6 and about 2.0 at the laser wavelengths of up to about 1.5 microns.

56. The apparatus of claim 49, wherein said bonding material comprises a two part epoxy.

57. The apparatus of claim 49, wherein said bonding material comprises a refractive index substantially matched to said laser gain media.

58. The apparatus of claim 49, wherein said bonding material fills a gap from about 1 millimeter up to about 10 millimeters between said absorbing frame and said laser gain media.

59. The apparatus of claim 49, wherein said one or more roughened edges enable an incident ray to spread out from a specular angle over a cone.

60. The apparatus of claim 59, wherein said cone comprises a width at half intensity between about 5 degrees and about 45 degrees.

61. The apparatus of claim 49, wherein said laser gain media is at least one laser gain media selected from neodymium doped gadolinium gallium garnet (GGG"), neodymium doped yttrium aluminum garnet (Nd:YAG), ytterbium doped yttrium aluminum garnet (Yb:YAG), Ti:sapphire (Ti:$Al_2O_3$), ruby ($Cr_2O_3$), and alexandrite ($BeAl_2O_4:Cr^{3+}$).

62. The apparatus of claim 49, wherein parasitic lasing can be inhibited at high average power extractions of up to about 100 kW.

63. The apparatus of claim 49, wherein said absorbing frame is capable of being cooled to selectively control heat transfer between said laser gain media and said frame.

64. The apparatus of claim 49, wherein said cooling further comprises passages for a cooling liquid.

65. The apparatus of claim 49, wherein said cooling liquid comprises water.

66. The apparatus of claim 49, wherein said absorbing frame is configured with cooling channels designed to heat and cool during operation to selectively control heat transfer between said laser gain media and said absorbing frame.

67. The method of claim 1, wherein the roughening produces random planar features larger than a wavelength of the light.

* * * * *